United States Patent
Tu

(10) Patent No.: US 9,104,246 B2
(45) Date of Patent: Aug. 11, 2015

(54) ELECTRONIC SYSTEM HAVING MULTIPLE INPUT KEYBOARDS AND OPERATION METHOD OF THE SAME

(71) Applicant: HTC Corporation, Taoyuan County (TW)

(72) Inventor: Wen-Hsiang Tu, Taoyuan County (TW)

(73) Assignee: HTC Corporation, Taoyuan (TW)

(*) Notice: Subject to any disclaimer, the term of this patent is extended or adjusted under 35 U.S.C. 154(b) by 98 days.

(21) Appl. No.: 14/029,822

(22) Filed: Sep. 18, 2013

(65) Prior Publication Data
US 2015/0077346 A1     Mar. 19, 2015

(51) Int. Cl.
*G06F 3/02* (2006.01)
*G06F 3/041* (2006.01)
*G06F 3/0488* (2013.01)

(52) U.S. Cl.
CPC  *G06F 3/02* (2013.01); *G06F 3/041* (2013.01); *G06F 3/04886* (2013.01)

(58) Field of Classification Search
CPC ......... G06F 3/02; G06F 3/041; G06F 3/0416; G06F 3/0488; G06F 3/04883; G06F 3/04886; G06F 2203/04803
USPC .......................................... 345/1.1, 168, 173
See application file for complete search history.

(56) References Cited

U.S. PATENT DOCUMENTS

| | | | | |
|---|---|---|---|---|
| 6,661,920 B1* | 12/2003 | Skinner | ...................... | 382/187 |
| 8,405,630 B1* | 3/2013 | Bi et al. | ...................... | 345/173 |
| 8,947,380 B2* | 2/2015 | Pasquero et al. | ............... | 345/173 |
| 2009/0167706 A1* | 7/2009 | Tan et al. | ...................... | 345/173 |
| 2011/0078567 A1* | 3/2011 | Kim et al. | ...................... | 715/702 |
| 2011/0179373 A1* | 7/2011 | Moore et al. | ................... | 715/773 |
| 2011/0242138 A1* | 10/2011 | Tribble | ......................... | 345/663 |
| 2011/0285631 A1* | 11/2011 | Imamura et al. | ............... | 345/168 |
| 2012/0050187 A1* | 3/2012 | Chen | ............................ | 345/173 |
| 2012/0206363 A1* | 8/2012 | Kyprianou et al. | ............ | 345/168 |
| 2013/0076632 A1 | 3/2013 | Sirpal et al. | | |
| 2014/0040810 A1* | 2/2014 | Haliburton et al. | ............ | 715/773 |
| 2014/0098024 A1* | 4/2014 | Paek et al. | ..................... | 345/168 |

FOREIGN PATENT DOCUMENTS

TW    I367514    7/2012

OTHER PUBLICATIONS

Corresponding Taiwanese Office Action that these art references were cited.

* cited by examiner

*Primary Examiner* — Tom Sheng
(74) *Attorney, Agent, or Firm* — CKC & Partners Co., Ltd.

(57) ABSTRACT

An electronic system having a multiple of input keyboards is provided. The electronic system comprises a touch display unit and a processing unit. The touch display unit displays a plurality of input fields. The processing unit links each of a plurality of virtual input keyboards correspondingly to one of the input fields to perform data processing on the input fields according to the operation input on each of the virtual input keyboards.

10 Claims, 4 Drawing Sheets

ELECTRONIC SYSTEM HAVING MULTIPLE INPUT KEYBOARDS AND OPERATION METHOD OF THE SAME

BACKGROUND

1. Field of Invention

The present invention relates to an electronic system. More particularly, the present invention relates to an electronic system having a multiple of input keyboards and an operation method of the same.

2. Description of Related Art

Handheld electronic devices are essential communication tools for people in the daily life for most people. Besides the ability of communication, the handheld electronic devices are equipped with increasing abilities of data operation and data processing. The combination of the data operation ability and the communication ability makes the handheld electronic devices such as the tablet PCs or the smartphones reminiscent to small computers. It is convenient to edit documents, navigate the network, receive e-mails and deliver e-mails by using the handheld electronic devices.

Similar to operating a normal computer, the user may operate different application software on the handheld electronic device at the same time. When different application software is operated at the same time, the user has to switch the keyboard and the input method in order to perform an input operation. However, the user needs to press the related operation key for many times to keep switching the keyboard and the input method. When the user frequently switches between different application software, the method of switching the keyboard and the input method is not intuitive and is not convenient.

Accordingly, what is needed is an electronic system having a multiple of input keyboards and an operation method of the same.

SUMMARY

The invention provides an electronic system having a multiple of input keyboards. The electronic system includes a touch display unit and a processing unit. The touch display unit displays a plurality of input fields at the same time. The processing unit links each of a plurality of virtual input keyboards correspondingly to one of the input fields to perform data processing related to the input fields according to at least one operation input applied to each of the virtual input keyboards at the same time.

Another aspect of the present invention is to provide an electronic system operation method used in an electronic system. The electronic system comprises a touch display unit and a processing unit. The electronic system operation method includes the steps outlined below. A plurality of input fields are displayed at the same time by the touch display unit. Each of a plurality of virtual input keyboards is linked correspondingly to one of the input fields by the processing unit. Data processing related to the input fields is performed according to at least one operation input applied to each of the virtual input keyboards at the same time by the processing unit.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
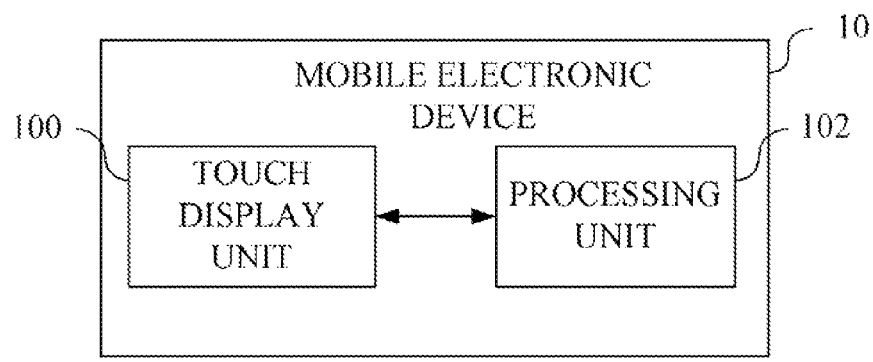
FIG. 1 is a block diagram of an electronic system having a multiple of input keyboard in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
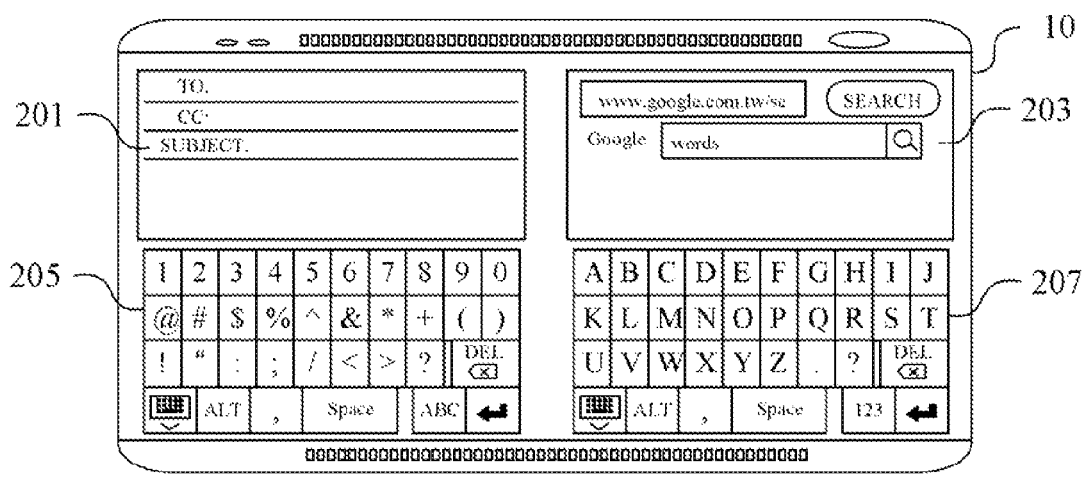
FIG. 2 is a top view of the electronic system in FIG. 1 in an embodiment of the present invention.

FIG. 1 is a block diagram of an electronic system 1 having a multiple of input keyboards in an embodiment of the present invention. FIG. 2 is a top view of the electronic system 1 in FIG. 1 in an embodiment of the present invention. The electronic system 1 includes a touch display unit 100 and a processing unit 102.

In the present embodiment, the touch display unit 100 and the processing unit 102 are actually disposed in a mobile electronic device 10. The mobile electronic device 10 can be such as but not limited to a smartphone, a tablet PC or a notebook computer.

The touch display unit 100 displays input fields 201 and 203. In the present embodiment, the input fields 201 and 203 correspond to an interface of an e-mail application program and an interface of a webpage browser respectively. in other embodiments, the number of the input fields displayed by the touch display unit 100 can be different. Further, the input fields can correspond to other types of application programs.

The processing unit 102 executes the application programs that the above-mentioned input fields 201 and 203 correspond to and controls the touch display unit to display the input fields 201 and 203. In the present embodiment, the processing unit 102 further links a plurality of virtual input keyboards, e.g. the virtual input keyboards 205 and 207 illustrated in FIG. 2, to one of the input fields 201 and 203 respectively. In the present embodiment, the processing unit 102 controls the touch display unit 100 to display the virtual input keyboard 205 and links the virtual input keyboard 205 to the input field 201. At the same time, the processing unit 102 controls the touch display unit 100 to display the virtual input keyboard 207 and links the virtual input keyboard 207 to the input field 203. The processing unit 102 further performs data processing related to the input fields 201 and 203 according to at least one operation input applied to each of the virtual input keyboards 205 and 207 at the same time.

It is noted that in FIG. 2, the virtual input keyboards 205 and 207 corresponds to the number input method and english input method. In other embodiments, the user can switch the virtual input keyboards 205 and 207 such that the virtual input keyboards 205 and 207 correspond to the same input method or correspond to the other input methods with different types or different languages.

In practical operation, when the user performs the operation input related to the numbers on the virtual input keyboard 205, the processing unit 102 performs data processing related to the numbers by using the application program corresponding to the input field 201 according to the operation input. In the present embodiment, the application program corresponding to the input field 201 is the e-mail application program illustrated in FIG. 2.

When the user performs the operation input related to the english characters on the virtual input keyboard 207, the processing unit 102 performs data processing related to the english characters by using the application program corresponding to the input field 203 according to the operation input. In the present embodiment, the application program corresponding to the input field 203 is the webpage browsing application program illustrated in FIG. 2. Explained in a different way, the processing unit 102 performs data processing according to the operation inputs applied to the two independent virtual input keyboards 205 and 207 at the same time.

Therefore, the user needs not to keep switching the input keyboard when different application programs are in operation at the same time. The different input keyboards can be operated independently. Under the trend of operating a multiple of application programs on the electronic system at the same time, the electronic system described above brings convenience to the input method.

Figure 3:
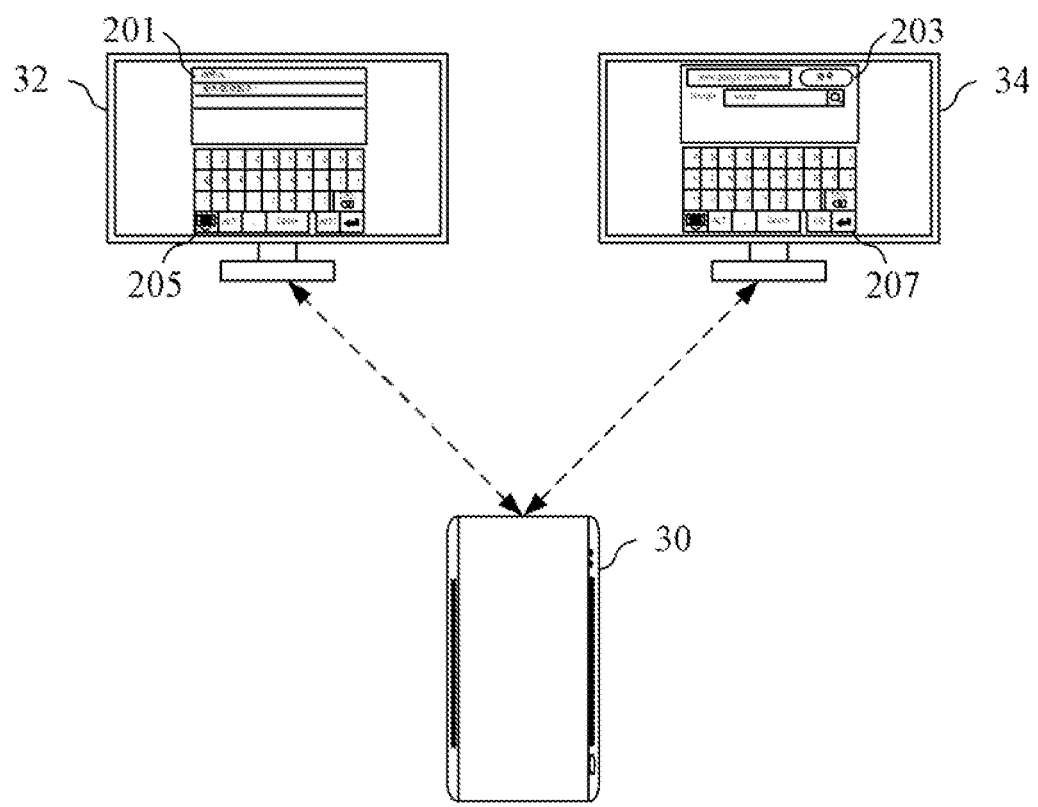
FIG. 3 is a diagram of an electronic system of an embodiment of the present invention.

FIG. 3 is a diagram of an electronic system 3 of an embodiment of the present invention. In the present embodiment, the electronic system 3 includes a mobile electronic device 30 and two touch displays 32 and 34 independent of the mobile electronic device 30.

The touch displays 32 and 34 are communicatively connected to the mobile electronic device 30. Similar to the mobile electronic device 10 illustrated in FIG. 1, the mobile electronic device 30 includes the touch display unit 100 and the processing unit 102 (not shown in FIG. 3). In the present embodiment, the processing unit 102 of the mobile electronic device 30 displays the input field 201 on the touch display 32 and displays the input field 203 on the touch display 34. Under such a condition, the input fields 201 and 203 are displayed either on the touch display unit 100 of the mobile electronic device 30 or on the touch displays 32 and 34. When the input fields 201 and 203 are displayed on the touch displays 32 and 34, the touch display unit 100 of the mobile electronic device 30 may be turned off.

In the present embodiment, the processing unit 100 of the mobile electronic device 30 controls the touch display 32 to display the virtual input keyboard 205 and links the virtual input keyboard 205 to the input field 201. Further, the processing unit 100 controls the touch display 34 to display the virtual input keyboard 207 and links the virtual input keyboard 207 to the input field 203. The user can perform the operation inputs on the virtual input keyboards 205 and 207. The processing module 100 of the mobile electronic device 30 can receive the operation input through the communicative connection between the mobile electronic device 30 and the touch displays 32 and 34. Furthermore, the processing module 100 performs data processing related to the input fields 201 and 203 according to the operation input on the virtual input keyboards 205 and 207. Subsequently, the processing module 100 outputs the result of the data processing to the touch displays 32 and 34.

Figure 4:
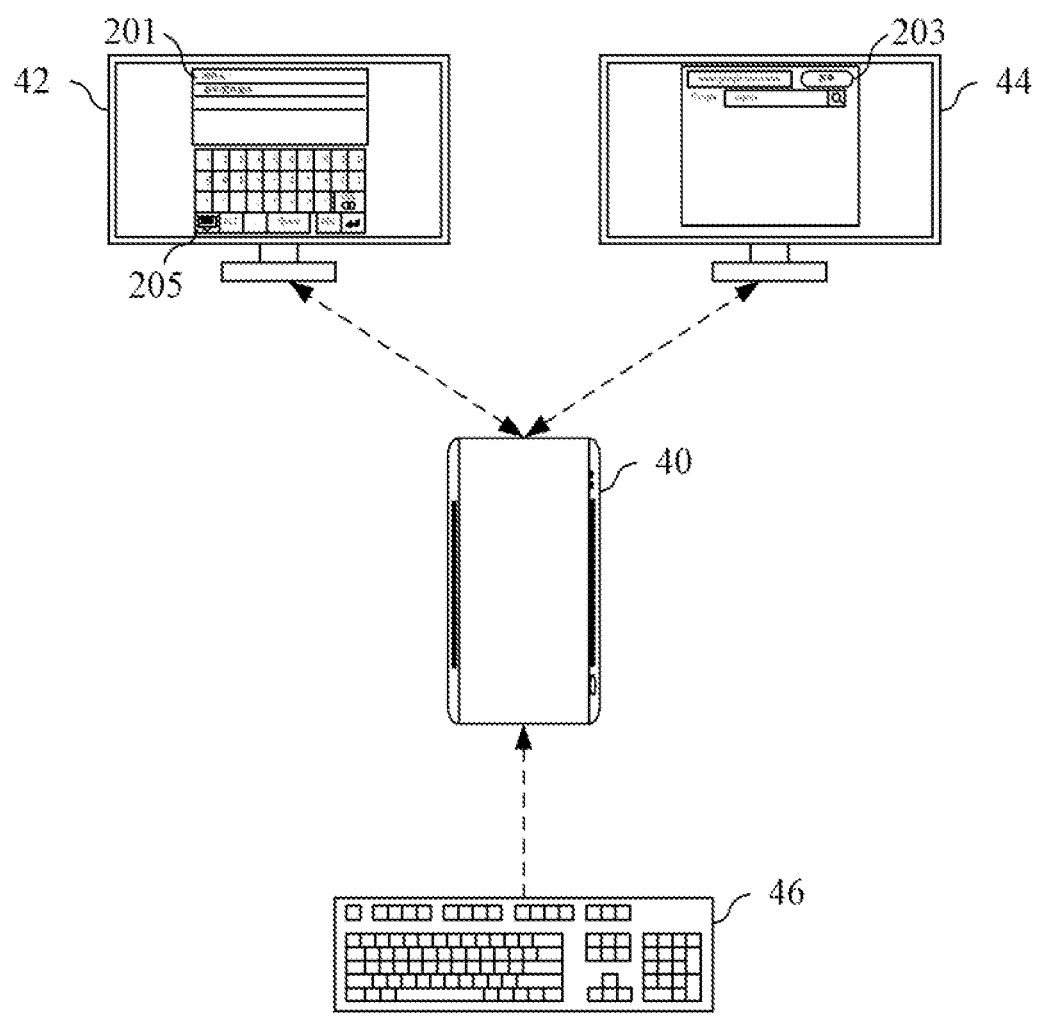
FIG. 4 is a diagram of an electronic system in an embodiment of the present invention.

FIG. 4 is a diagram of an electronic system 4 in an embodiment of the present invention. In the present embodiment, the electronic system 4 includes a mobile electronic device 40, two touch displays 42 and 44 independent of the mobile electronic device 40 and a physical keyboard 46.

The touch displays 42 and 44 are communicatively connected to the mobile electronic device 40. Similar to the mobile electronic device 10 illustrated in FIG. 1, the mobile electronic device 40 includes the touch display unit 100 and the processing unit 102 (not shown in FIG. 4). In the present embodiment, the processing unit 102 of the mobile electronic device 40 displays the input field 201 on the touch display 42 and displays the input field 203 on the touch display 34.

In the present embodiment, the processing unit 102 of the mobile electronic device 40 controls the touch display 42 to display the virtual input keyboard 205 and controls the mobile electronic device 40 to be communicatively connected to the physical keyboard 46. The physical keyboard 46 can either be communicatively connected to the mobile electronic device 40 through a wired way, such as using the universal serial bus or other interfaces, or be communicatively connected to the mobile electronic device 40 through a wireless way, such as using Bluetooth or other wireless transmission technologies.

Accordingly, the user can perform operation inputs on the virtual input keyboard 205 and the physical keyboard 46. The processing unit 102 of the mobile electronic device 40 can receive the operation input applied to the virtual input keyboard 205 through the communicative connection between the mobile electronic device 40 and the touch displays 42. The processing unit 102 further performs data processing related to the input field 203 according to the operation inputs. On the other hand, the physical keyboard 46 is linked to the input field 203 displayed by the touch display 44 after the appropriate setting made by the processing unit 102 of the mobile electronic device 40. The processing unit 102 further receives physical operation inputs applied to the physical keyboard 46 to perform data processing related to the input field 203. The result of the data processing is further outputted to the touch displays 42 and 44.

According to embodiment described above, the electronic system of the present invention can display the input field on the touch display. The operation input is received from the touch display or from the external physical keyboard by the processing unit of the mobile electronic device such that the related data processing is performed subsequently. The user can still use different virtual input keyboards or physical keyboards to apply the operation inputs to different input fields. The electronic system described above brings convenience to the input method.

Figure 5:
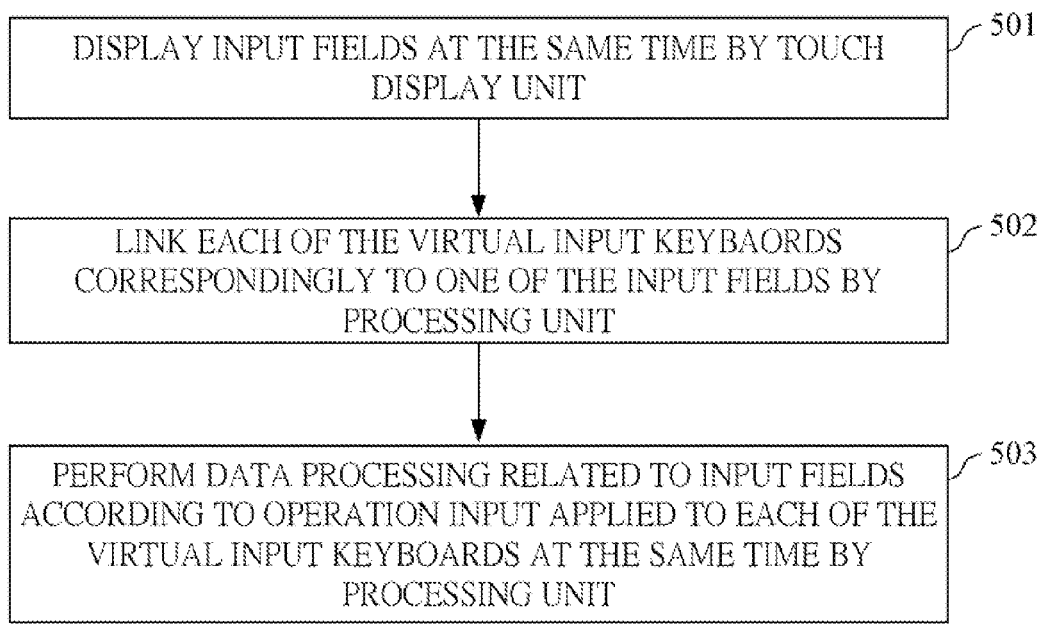
FIG. 5 is a flow chart of an electronic system operation method in an embodiment of the present invention.

FIG. 5 is a flow chart of an electronic system operation method 500 in an embodiment of the present invention. The electronic system operation method 500 is used in the electronic system 1 illustrated in FIG. 1, FIG. 3 or FIG. 4. The electronic system operation method includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 501, a plurality of input fields 201 and 203 are displayed at the same time by the touch display unit 100.

In step 502, each of a plurality of virtual input keyboards 205 and 207 are linked correspondingly to one of the input fields 201 and 203 by the processing unit 102.

In step 503, data processing related to the input fields 201 and 203 is performed according to operation input applied to each of the virtual input keyboards 205 and 207 at the same time by the processing unit 102.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electronic system having a multiple of input keyboards, wherein the electronic system comprises:
   a touch display unit for displaying a plurality of input fields at the same time; and
   a processing unit for linking each of a. plurality of virtual input keyboards correspondingly to one of the input fields to perform data processing related to the input fields according, to at least one operation input applied to each of the virtual input keyboards at the same time;
   wherein the processing unit further operates a plurality of application programs, and each of the plurality of input fields corresponds to one of the plurality of application programs;
   wherein the plurality of virtual input keyboards are displayed on the touch display unit.

2. The electronic system of claim 1, wherein the touch display unit and the processing unit are disposed in a mobile electronic device.

3. The electronic system of claim 2, further comprising a plurality of touch displays communicatively connected with the mobile electronic device, wherein the processing unit displays each of the plurality of input fields on one of the touch displays.

4. The electronic system of claim 3, wherein the plurality of virtual input keyboards are displayed on the touch displays and the processing unit performs data processing related to the input fields according to the operation input applied to each of the virtual input keyboards.

5. The electronic system of claim 3, further comprising at least one physical keyboard communicatively connected to the mobile electronic device, wherein the processing unit performs data processing related to the input fields according to a physical operation input applied to the physical keyboard.

6. An electronic system operation method used in an electronic system, wherein the electronic, system comprises a touch display unit and a processing unit, the electronic system operation method comprises:
   displaying a plurality of input fields at the same time by the touch display unit;
   linking each of a plurality of virtual input keyboards correspondingly to one of the input fields by the processing unit; and
   performing data processing related to the input fields according to at least one operation input applied to each of the virtual input keyboards at the same time by the processing unit;
   operating a plurality of application programs by the processing unit such that each of the plurality of input fields corresponds to one of the plurality of application programs;
   controlling the touch display unit to display the plurality of virtual input keyboards by the processing unit.

7. The electronic system operation method of claim 6, wherein the touch display unit and the processing unit are disposed in a mobile electronic device.

8. The electronic system operation method of claim 7, wherein the electronic system thither comprises a plurality of touch displays communicatively connected with the mobile electronic device, the electronic system operation method further comprises:
   displaying each of the plurality of input fields on one of the touch displays by the processing unit.

9. The electronic system operation method of claim 8, further comprising:
   displaying the plurality of virtual input keyboards on the touch displays, and
   performing data processing related to the input fields according to the operation input applied to each of the virtual input keyboards by the processing unit.

10. The electronic system operation method of claim 8, wherein the electronic system further comprises at least one physical keyboard communicatively connected to the mobile electronic device, the electronic system operation method further comprises:
    performing data processing related to the input fields according to a physical operation input applied to the physical keyboard by the processing unit.

* * * * *